United States Patent

Handl

[11] Patent Number: 6,092,950
[45] Date of Patent: Jul. 25, 2000

[54] METHOD OF MANUFACTURING LAMINATED PLATES, PENCIL BOARDS AND/OR SHAFTS FOR WRITING, DRAWING OR PAINTING

[75] Inventor: Werner Handl, Altdorf, Germany

[73] Assignee: J.S. Staedtler GmbH & Co., Nuremberg, Germany

[21] Appl. No.: 09/221,098

[22] Filed: Dec. 28, 1998

[30] Foreign Application Priority Data

Dec. 31, 1997 [DE] Germany ............................ 197 58 266
Dec. 31, 1997 [DE] Germany ............................ 197 58 265

[51] Int. Cl.[7] .............................. B43K 19/14; B32B 5/16
[52] U.S. Cl. .................................................................. 401/96
[58] Field of Search .................................................. 401/96

[56] References Cited

FOREIGN PATENT DOCUMENTS

| 831524 | 9/1938 | France | 401/96 |
| 856110 | 9/1952 | Germany | 401/96 |
| 91/11334 | 8/1991 | WIPO | 401/96 |
| 94/25264 | 11/1994 | WIPO | 401/96 |

*Primary Examiner*—Charles R. Eloshway
*Attorney, Agent, or Firm*—Friedrich Kueffner

[57] ABSTRACT

A method of manufacturing laminated plates, pencil boards or shafts for utensils for writing, drawing or painting, wherein the method includes initially producing in a container a pulp essentially composed of raw material powder and/or fibers and water, wherein the pulp is essentially free of binding agent, applying the pulp onto a screen and predrying the pulp in layers in the form of webs or foils so as to form a non-woven fabric, rolling the fabric onto a roller, applying between the material layers a connecting layer of binding agent, adhesives and/or other additives and cutting, dehydrating and drying the resulting plates and subjecting the plates to further processing.

3 Claims, 3 Drawing Sheets

METHOD OF MANUFACTURING LAMINATED PLATES, PENCIL BOARDS AND/OR SHAFTS FOR WRITING, DRAWING OR PAINTING

BACKGROUND OF THE INVENTION

1. Field of the Invention

The present invention relates to a method of manufacturing laminated plates, pencil boards and/or shafts for writing utensils, drawing utensils or painting utensils.

2. Description of the Related Art

In connection with the present invention, laminated plates discussed below are particularly plates of layers which are connected to each other and are composed preferably of fibers or other particles of all types which can be compressed together, and whose components are connected to each other mechanically or by chemical additives.

Laminated materials generally are understood to be plates or other bodies of web-shaped or foil-shaped materials which are composed preferably of wood fibers, of other pulp or cellulose fibers or of other natural or synthetic fibers or powders and which have several layers or material webs.

When the laminated materials are present as compressed fiber plates, they may also form the base plate out of which are obtained a certain number of smaller boards or other base bodies for further processing, for example, by sawing, punching or cutting, wherein these boards or other base bodies may then be used, for example, for furniture or for manufacturing shafts of writing utensils.

The proposed laminated plates can also be used, for example, for manufacturing boards or so called pencil boards which usually are used as base bodies for the manufacture of pencils or color pencils and constitute intermediate products for this purpose which are conventionally present in solid state and the approximate size of several half pencils, for example, five to twelve or preferably seven to ten half pencils, from which, after riveting, gluing in the leads and connecting two complementary boards with each other, the final pencils are manufactured, wherein the shafts of these pencils are then made of these intermediate products.

In the case of mechanical pencils or other utensils for writing, painting or cosmetics, the manufacture of the shaft and the preparation of the receiving boards for the leads can also be effected, for example, by manufacturing such boards having the total shaft thickness and then providing the boards with the required bores and/or other perforations.

Conventional fiber plates, for example, so called compressed chip plates or wood fiber plates, are in those cases manufactured of compressed wood fibers or lignocellulose-containing fiber material. By applying heat, moisture, mechanical forces, particularly compressive forces and/or chemicals, the raw material containing the lignin, cellulose and hemicellulose is comminuted in defibrating plants into its fiber-like anatomic basic components in the form of individual fibers and fiber bundles.

In connection with the present invention, the writing utensils mentioned below are particularly utensils of all types for writing, drawing and painting, wherein the writing element of the utensils usually is a lead of a suitable writing or painting agent which is rigidly connected to the shaft.

However, the proposed shafts for writing utensils can also be used for those utensils for writing, drawing or painting whose writing elements are mounted so as to be axially movable and possibly even exchangeable in the shaft. These may be various mechanical writing utensils, such as ball point writing devices or wick writing devices of all types, fountain pens or also so called drop pens or fine lead pens with different clamping and/or feeding mechanisms. In the same manner, the writing utensil shaft of the above-described type is also suitable for manufacturing cosmetic pencils of all types and, thus, also includes those various products in which the lead placed in the shaft is constituted of a cosmetic preparation or contains a cosmetic preparation.

Fiber plates, such as compressed chip plates or also wood fiber plates, are generally not new in the art. For example, DE-OS 23 25 670, WO 94/25264, EP 518018 A1 and U.S. Pat. No. 5,346,930 disclose the use of digested fiber material, usually called cellulose, for manufacturing fiber plates. These fibers are usually manufactured from chips in accordance with the chemo-thermo-mechanical pulping method or CTMP method or the thermo-mechanical pulping method or TMP method. These fiber materials are prepared in water to form a so called pulp sludge and possibly after the addition of binding agents and/or other additives, are placed on the screen of a paper machine. After dehydration, the non-woven fiber fabric is received by a format roller and is further hydrated.

For the manufacture of shafts for writing utensils or of boards for manufacturing the shafts, fiber plates having a thickness of about 5.0 mm are required. This means that the fiber fabric must have such a thickness that, after complete drying and shrinkage, these final thickness dimensions are reached. Since this can essentially not be achieved by using a single layer, several layers are produced and placed on the format roller. Consequently, the final fiber carpet is composed of several layers, preferably four to forty layers. Once the desired number of layers has been reached on the format roller, the material extending beyond the length of the roller is cut or separated and the carpet material is unwound over the length of the roller. The fiber carpet which is then composed of individual layers can now be further partially dehydrated and calibrated by being passed through a nip.

For completely dehydrating or drying the fiber carpet it travels through a drying tunnel. The fiber carpet can also be treated to reach its final properties by hot pressing in a heated wet press.

The methods previously known in the art have the disadvantage that the products manufactured using these methods have without additional binding agents not a sufficient adherence between the individual layers because the non-woven connection alone usually results only in a weak connection and is frequently not stable.

When later processed by planing, milling, cutting or sharpening, etc., portions of the layers are torn out and deformations occur.

However, the use of binding agents has not been found very useful in this connection because most binding agents do not have a sufficient retention on the fiber surface or in the non-woven fiber fabric and are for the most part washed out during dehydration. Consequently, in addition to the deficient adherence of the layers, the washed-out binding agent causes significant presence to the environment or waste water and the attendant problems. When used with a high binding agent concentration necessary for a sufficient effectiveness, this results in relatively stable final products, however, the costs for their production are frequently not economically acceptable.

Shafts for writing utensils of laminated materials and methods for manufacturing such shafts or pencils, are also generally known in the art. Used as initial bodies for this purpose are particularly direct windings around the respective lead or also prefabricated boards of laminated fiber material. For example, DE-GM 90 01 243 and DE-OS 40 03 289 disclose the manufacture of shafts for writing utensils from a sheathing of web-like or foil-like layers of paper, wood or synthetic material. In this method, the foil-shaped webs which are arranged one above the other in several layers or are placed or rolled one above the other, are glued together in such a way that they result in a shaft which has a high bending stiffness and may be sharpened.

In the case of rolled sheathings this shaft may be formed of a web layer coated on one side with adhesive and rolled up. It is not disclosed how the individual particles of the foil are to be connected to each other. For gluing the individual foil layers together, wood glue or cold glue or dispersion adhesives, preferably polyvinyl-acetate adhesives or other synthetic material dispersions are proposed. Another principal problem of these methods is that they do not disclose anything concerning the usually required binding agents for the fiber connection and it is mentioned concerning the processing thereof that the rolling method using the indicated methods is very difficult to carry out and that it is also not clear how the laminated boards can be manufactured on a large scale.

Swiss Patent 204 257 and German Patent 856 110 additionally disclose the manufacture of shafts for writing utensils in which pencil boards are manufactured as intermediate products in such a way that solid wood foil layers having a thickness of about 0.05 to 0.25 mm are coated or impregnated with binding agent and are connected to form wood boards. In accordance with another embodiment, it is also possible to provide intermediate layers of wood dust if the product to be manufactured is to have a lighter weight. For this purpose, the wood dust is additionally scattered on to the wood foil coated with binding agent. The binding agent may be applied in liquid or solid form on to the foils and may additionally be mixed with softeners which are supposed to penetrate into the wood together with the binding agent in order to impregnate the wood.

The wood boards manufactured in this manner are then pressed, wherein it is possible to simultaneously press the grooves for the lead and a portion for the outer pencil profile. Since such profiling pressing methods are very difficult to carry out in industrial productions and are also expensive and the result additionally depends to a high degree also on the type of the wood being used, it is questionable whether the disclosed solutions have ever been useful or are now useful for producing useful results. In addition, the disclosed methods become more expensive because each profiled plate must be separately placed for pressing.

In the case of non-profiled pressed plates which are further processed in the manner of solid wood boards, it is also necessary to make sure that the fibers are directed in the same direction which makes it even more expensive to carry out this method.

SUMMARY OF THE INVENTION

Therefore, it is the primary object of the present invention to propose a method of manufacturing laminated plates, pencil boards and/or shafts for writing utensils, drawing utensils or painting utensils which can be manufactured simply and in an environmentally safe manner and will still produce stable intermediate or end products which may also be easily processed further. The plates and/or boards are to be manufactured economically and on a large scale. The methods are to avoid the disadvantages described above and should especially be carried out in such a way that increased burdens on the waste water or environment are avoided. Writing utensils or shafts of writing utensils manufactured of these laminated materials should be stable and still be easily sharpenable.

In accordance with the present invention, a method of the above-described type includes the steps of initially preparing in a container a pulp essentially composed of raw material powder and/or fibers and water and essentially free of binding agents, placing the pulp on a screen and predrying the pulp in web-shaped or foil-shaped layers so as to form a non-woven fiber fabric, rolling the fabric onto a roller and simultaneously placing between each material layer, a connecting layer of binding agent, of adhesives and/or other additives and cutting, dehydrating and drying the resulting plates and further processing the plates in the conventional manner, possibly also to form pencil boards and/or shafts for utensils for writing, drawing or painting.

The plates, boards and/or shafts according to the present invention are composed of laminated materials, wherein the individual material layers are initially free of binding agent and wherein between each material layer a layer of binding agent is arranged, wherein the binding agent migrates or penetrates into the adjacent material layers during layering, pressing and drying. If the material layers are of fiber material, the fibers thereof are essentially oriented in the longitudinal direction in order to provide the pencil with an increased bending stiffness.

For manufacturing the proposed laminated material or compressed fiber plate or individual boards which can be used as initial bodies for writing, drawing or painting utensils, initially a material sludge of wood chips or other natural fibers or powders and water is produced in the conventional manner in a pulper.

This aqueous material suspension or pulp is then placed, for example, on a long screen and after dehydration is taken up by a format roller and is rolled onto the roller. The binding agent, which hereinbelow is to be understood to be any suitable binding agent, binding agent mixture and/or adhesive, and/or additional additives are not already introduced into the aqueous fiber mixture but only after a first drying on the long screen, on another revolving paper screen or other drying device, are they selectively and sequentially placed on each fiber fabric as a coating on the format roller or on a round screen or another receiving device. In this connection it is advantageous to use, for example, the technologies of spraying, rolling or calendaring. In this method, each individual layer or web is connected or glued in itself as well as to the adjacent web or layer without washing out or otherwise loosing binding agent, adhesive or any other additives which may have to be applied. The binding agents, the adhesives and/or the other additives form intermediate layers and diffuse also into the hollow spaces of the fibers of the individual webs and connect and anchor the individual fibers to each other practically in all layers and in all directions.

The binding agents and/or the adhesives are then usually or preferably thermally hardened. This is effected by passing the materials through a heated drying tunnel and/or by using a hot press. When using the hot pressing it is also possible to vary the density of the final product.

The fiber types to be used for the plates according to the present invention and for forming the pulp may be from various woods, particularly also indigenous woods as well as fibers from short shoots and annual plants, such as hemp, jute, sisal, bamboo, kenaf or gambo, coconut or cotton.

To be used preferably as binding agents are urea formaldehyde resins, mixed resins of urea formaldehyde and malamin, phenol formaldehyde resins, tannin formaldehyde resins, resins on the basis of polymer diisocyanate, furan resins, acrylic and methacrylic resins, as well as cobinding agents, lignins, tannins, cellulose derivatives, polyvinyl alcohols, polyvinyl pyrrolidones, starch and starch derivatives, pectines, alginates, guar derivatives and tragacanth.

The additives which may additionally be added have especially the purpose of favorably influencing the manner in which the process is carried out. Thus, these materials have the purpose of keeping the fibers flexible and prevent them from becoming brittle on the one hand, and to ensure that a high sliding and lubricate effect is achieved for the processing machines which run at high speeds, on the other hand. In addition, these materials have the purpose, for example, of increasing the sharpenability of the finished writing utensil. Particularly suitable for this purpose are waxes or wax emulsions, fatty acids and/or the salts thereof, fatty alcohols and/or polyglykols. Also advantageous have been found additions of boron nitride, talcum, graphite and PTFE.

The shafts according to the present invention are manufactured of laminated materials, wherein the individual material layers are initially free of binding agents and wherein a layer of binding agent is arranged between each material layer. This binding agent migrates or penetrates into the adjacent material layers during layering, pressing and drying and, thus, forms a migration layer.

To the extent that the material layers are of fiber material, these fibers are oriented essentially in the longitudinal direction, so that the pencil has an increased bending strength.

The manufacture of the boards or the compressed fiber plates serving as initial materials for the boards has already been described above. The invention will now be described in more detail with respect to two examples.

1.) Manufacturing Example

A sludge of wood chips and water is produced in a pulper. The material suspension or the pulp is placed on a long screen and is received after the dehydration by a format roller. A dispersion of a phenol novolake with hexamethylene tetramine as binding agent and calcium stearate as sliding agent is sprayed onto the fabric web. The ratio between binding agent to sliding agent is 2:1 in relation to solids.

With a fabric weight of about 80 g/m$^2$ in the absolutely dry state, about thirtyfive layers are required for a plate having a thickness of 5.00 mm and a density of 0.65. The binding agent and sliding agent content (density 1.0 after the condensation) is about 14% by weight.

After the required number of layers has been reached, a cut is carried out and the glued-together fabric carpet is unwound over the roller circumference and is conveyed through a drying tunnel. The temperature increases to 170° C. over the length of the tunnel.

The binding agent which has in the meantime also been diffused into the individual layers is completely condensed out and, after cooling, it is possible to sew boards of any size from the finished plate and to rivet them in the conventional manner as desired and to further process them to form pencils or other articles.

Instead of using a format roller, the fiber fabric can also be produced, for example, by a round screen and the binding agent can be applied in the same manner after the couch roller on the transfer roller.

However, it has been found that the best results are achieved on long screen machines because, by varying the application of material, the screening speed and dehydration, the fiber orientation and the web formation can be favorably influenced in accordance with the desired properties. For example, by orienting the fibers, it is possible to produce an essentially anisotropic plate.

2.) Manufacturing Example

In accordance with an alternative method according to the present invention, the plates can also be impregnated additionally or also exclusively with binding agents and/or additives, as it is already the case in the conventional manufacture of pencils.

Consequently, it is also possible to operate on the paper machine initially without binding agent and without sliding agent, wherein the solidification or modification is effected by a subsequent impregnation with binding agent and/or possibly additional additives.

For connecting the individual layers on the format roller, it is possible to apply for this purpose only a thin layer of adhesive which, however, must have certain permeability to the binding agent and/or the other additives to be added.

After cooling, pencil boards of any desired size are sawed from the finished plate and are riveted in the conventional manner and are further processed into pencils or other articles.

The various features of novelty which characterize the invention are pointed out with particularity in the claims annexed to and forming a part of the disclosure. For a better understanding of the invention, its operating advantages, specific objects attained by its use, reference should be had to the following descriptive matter in which there are described preferred embodiments of the invention.

DESCRIPTION OF THE PREFERRED EMBODIMENTS

Figure 1:
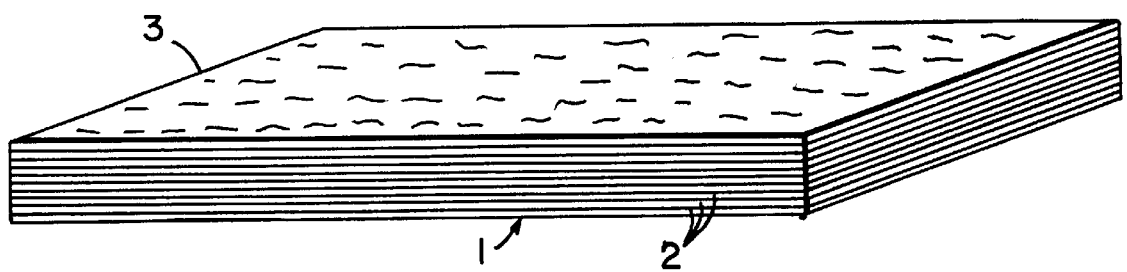
FIG. 1 is a perspective view of a laminated plate according to the present invention.

FIG. 1 of the drawing shows a laminated plate 1 according to the present invention composed of layers 2 or webs or foils of natural fibers 3 or powders of wood fibers or wood chips, wherein the layers are placed one on top of the other and connected to each other.

Figure 2:
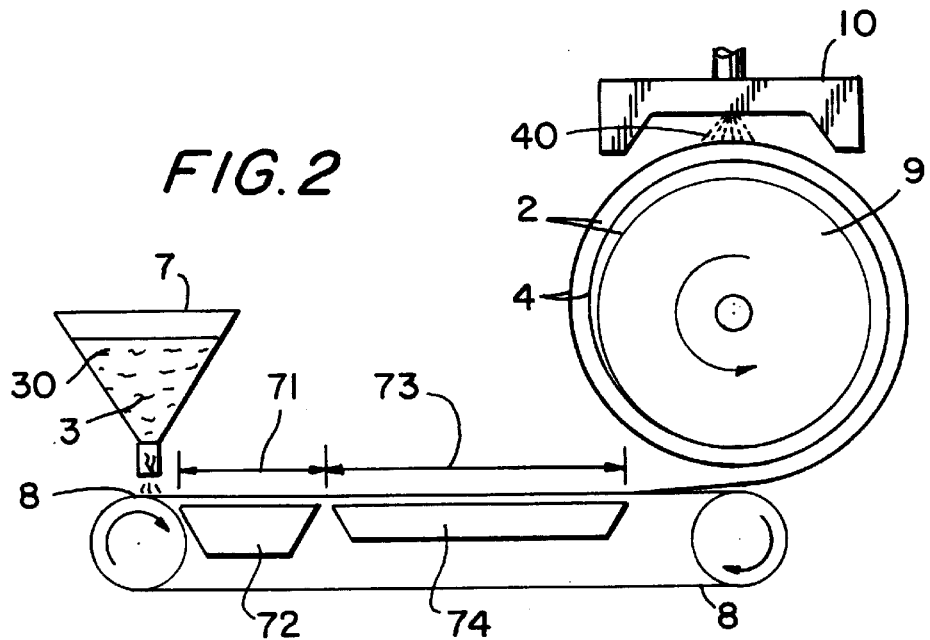
FIG. 2 is a side view of an apparatus for manufacturing the laminated plates according to the present invention.
Figure 3:
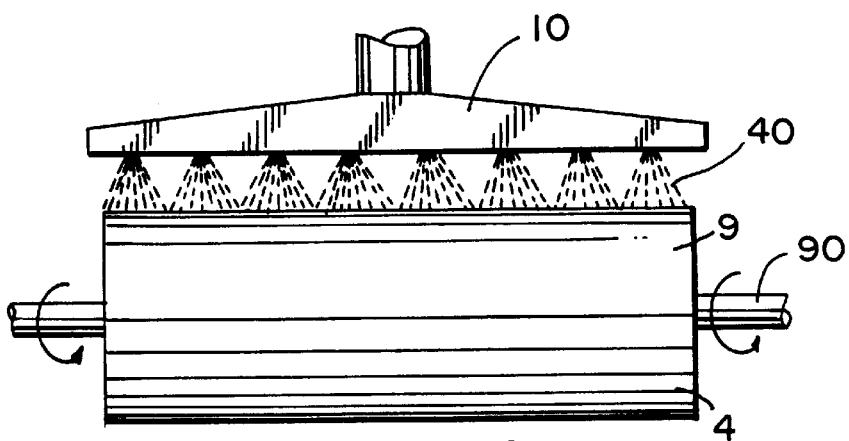
FIG. 3 is a side view of a format roller and the spraying device of FIG. 2.

As illustrated in FIGS. 2 and 3, for manufacturing the laminated plate 1, initially a pulp 30 is manufactured in a pulper or container 7 which essentially is composed of raw material powder and/or fibers 3 and water and which is essentially free of binding agents.

This pulp 30 is placed on a screen 8 which, in the illustrated embodiment, is a screen which travels at a relatively high speed, and the pulp 30 is predried in the form of webs or foils in layers so as to form a fabric.

The predried fabric is then rolled onto a roller 9. Simultaneously, a connecting layer 4 of binding agent, adhesives and/or other additives, is applied as a substrate 40 from a spraying device 10 between each material layer 2.

Figure 4:
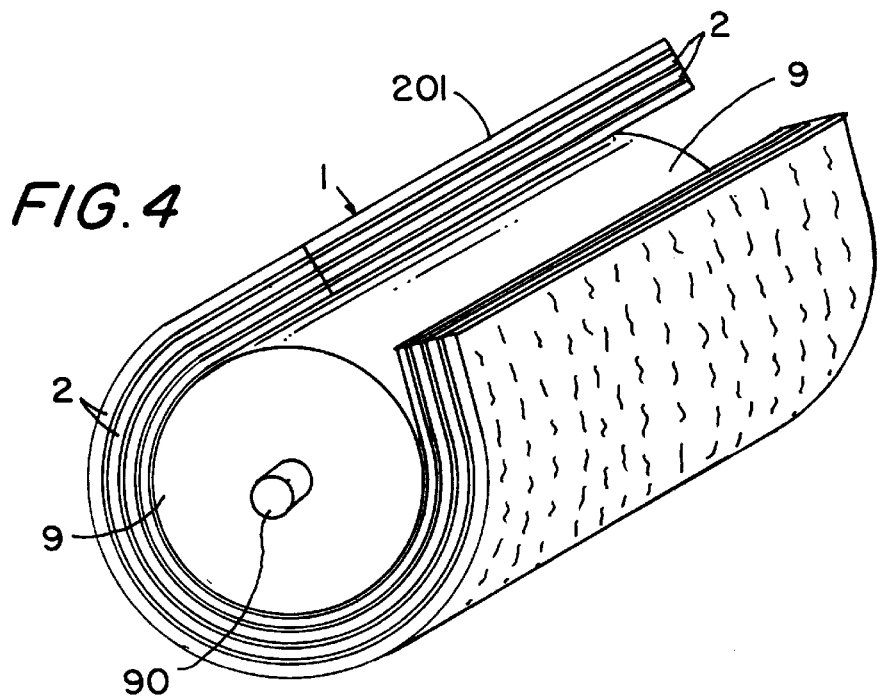
FIG. 4 is a perspective view of the format roller of FIG. 3 with a cut material web.
Figure 5:
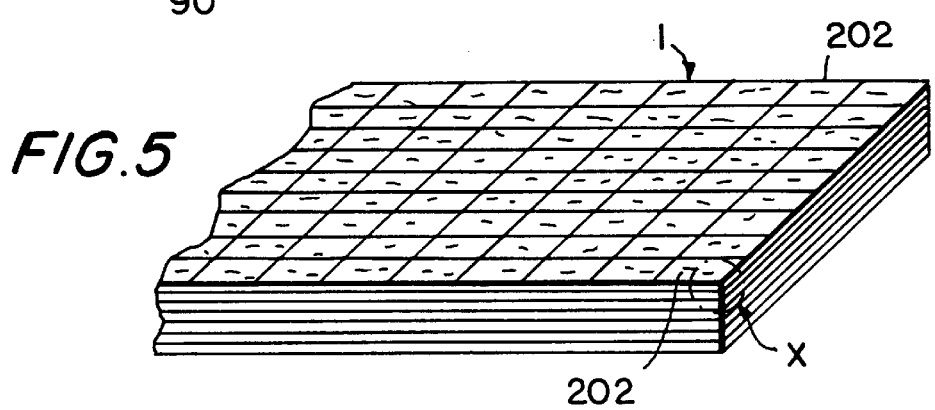
FIG. 5 is a perspective view of a laminated plate as a blank for manufacturing boards.
Figure 8:
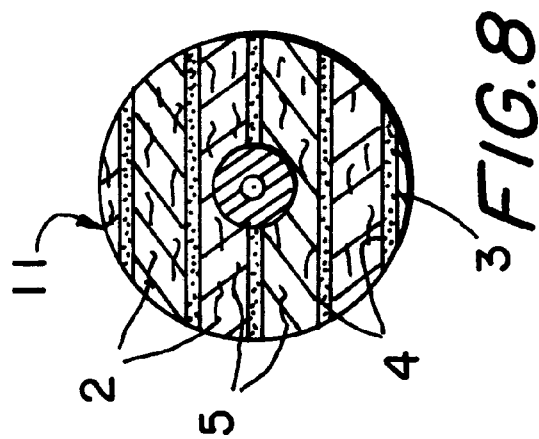
FIG. 8 is a cross-sectional view of the writing utensil of FIG. 7.
Figure 7:
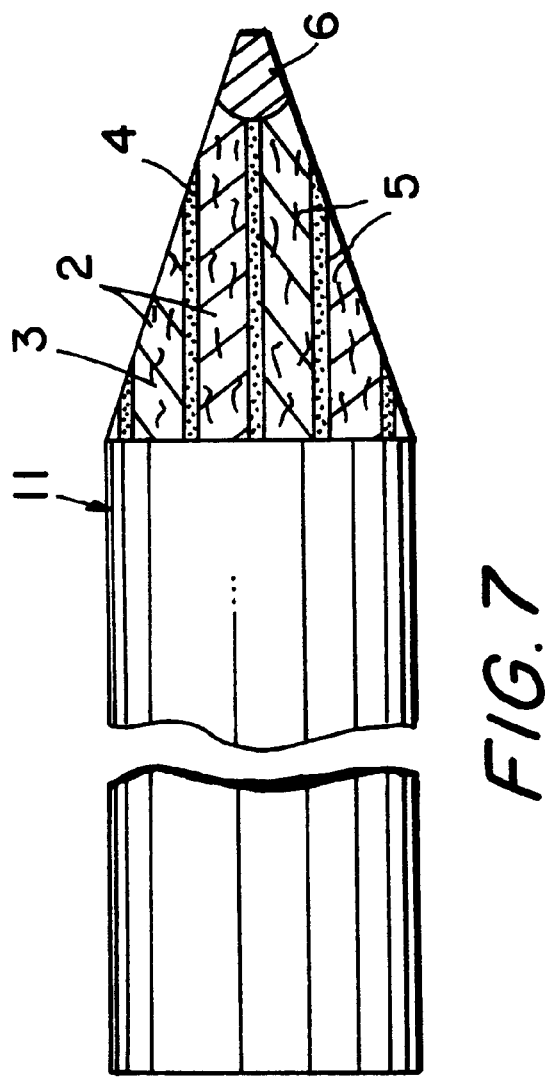
FIG. 7 is a writing utensil according to the present invention.

The plate 1 produced after dehydrating and final drying in accordance with FIGS. 1, 3 and 4, may then be further processed in the conventional manner into boards or pencil boards 202, shown in FIGS. 4 and 5 and/or directly into shafts 11 for writing utensils, as shown in FIGS. 7 and 8. Within the individual layers 2, which are initially placed as a pulp of fibers 3 and water onto the screen 8, the fibers 3 are oriented in an orientation region 71 above a first dehydrating zone 72 in the longitudinal direction and are then fixed in a fixing area 73 in a vacuum 74 during further drying.

For achieving the desired board thickness, initially a required number of fiber fabric layers 2 is placed on the roller 9, for example, a format roller, which is mounted on a shaft 90. Subsequently, the entire applied material is cut along a cutting line 201 on the roller 9 and is then subjected to afterdrying and possibly also a thermo aftertreatment and/or pressing, so that the binding agent and/or adhesive may be further solidified.

The plates 1 or boards 202 are finished after drying and possibly pressing of the plates one by cutting them to the desired size and possibly by making the grooves 203. This is done in the conventional manner, wherein the application of glue as well as the placement of the leads can also be carried out in the conventional manner.

FIGS. 4 and 5 of the drawing make it clear that the dimensions of the plate 1 depend on the width and the diameter of the roller 9, on the one hand, and on the number of layers 2 which are placed on top of each other, on the other hand. The finished winding is cut along a continuous cutting line 201 and is placed flat in a plane. This raw plate is then possibly afterdried and pressed until the desired strength and the required degree of drying have been reached.

Depending on the desired size of the plates 1 or the products to be manufactured from the plates 1, for example, pencil boards 202 or other shaped bodies, these plates 1 can then be sawed, punched or otherwise cut without producing waste.

Figure 6:
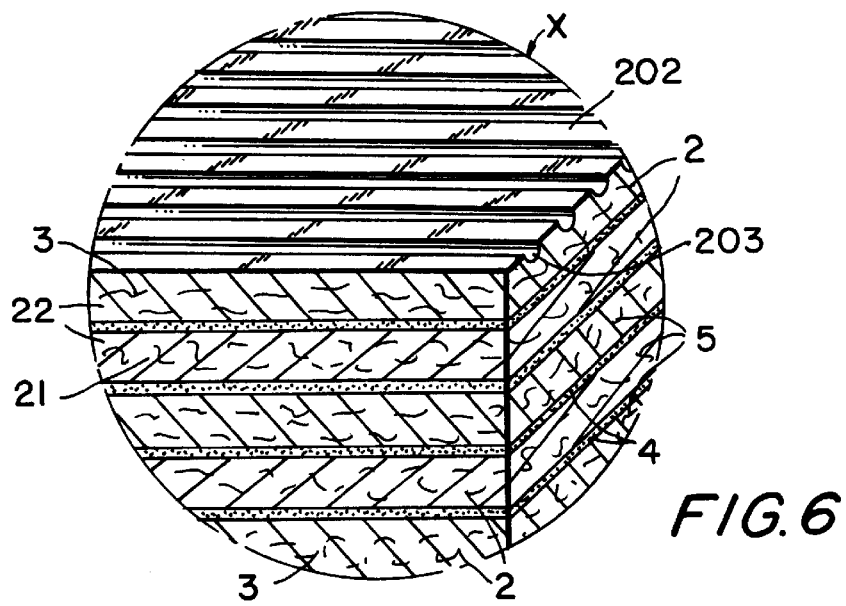
FIG. 6 is an illustration, on a larger scale, of detail X of FIG. 5.

In FIG. 6, which shows the enlarged detail X of FIG. 5, it can be seen that the plates 1 or the boards 202 can already be provided with grooves 203 into which, for example, leads for writing utensils can be placed or glued subsequently. These grooves 203, or other patterns or structures, can be formed already during pressing or also can be cut subsequently.

The binding agents which travel from the connecting layers 4 into the layers 2 form migration layers 5 which penetrate either only into the border areas 22 or also into the respective core areas 21. As illustrated, the individual fibers 3 are oriented in the longitudinal direction and extend essentially parallel to the grooves 203 in order to further stabilize the plates or the finished products.

Using two complementary boards 202 and usually previously gluing a lead into one of those boards 202, a pressed article is manufactured from which, in turn, depending on the requirements and dimensions, five to twelve individual pencils can be cut and manufactured to form writing, drawing or painting utensils.

Before the material layers are connected to each other, the individual layers 2 of the basic substance are essentially free of binding agents and/or adhesives. A connecting layer 4 of binding agents, adhesives and/or other additives which are capable of migration is placed between all these material layers 2. As illustrated in the drawing, the connecting layer 4 formed by the binding agent, the adhesive and/or the other additives has penetrated as a migration layer 5 at least partially into the respective material layer 2 and, after the material layers have been connected, the migration layer 5 is present distributed partially or possibly differently between the individual fibers 3 or particles of the material layers.

The binding agent, the adhesive and/or the other additives of the connecting layer 4 are present non-uniformly distributed between the individual fibers 3 or the particles of the material layers 2 within the migration layer 5 and, thus, within each layer 2.

A concentration difference of the binding agent, adhesive and/or other additives exists in the material layers 2, wherein less binding agent, adhesive and/or other additives are present in the core portions 21 of the material layers 2 than in the border portions 22 of the layers 2.

It is particularly advantageous in this connection that the individual material layers 2 of the shaft 1 are essentially free of binding agents and/or other additives before the layers are connected to each other and before the connecting layers 4 are applied. This saves binding agent or the like and also makes it possible to produce the product without harming the environment.

Pencil boards are required as an intermediate product or a typical initial product for the conventional production of pencils. These pencil boards advantageously also are composed of the laminated materials according to the present invention, wherein the material layers 2 or webs or foils are composed of natural fibers 3 or powders, particularly wood fibers or wood chips, and can be used for manufacturing writing utensils or shafts composed of laminated materials. In this case, the individual material layers 2 are also initially free of binding agent and a connecting layer 4 of binding agent, adhesive and/or other additives is present between the material layers 2.

Consequently, these connecting layers 4 contain the binding agent and/or the other additives for the layers 2 or for the individual fibers 3 or particles. This connecting layer 4 then penetrates as a migration layer 5 with usually different concentrations and densities into the individual layers 2 and primarily into the border regions 22 thereof, and is hardened or solidified in the layers 2. Also in this case, the individual layers 2 or webs or foils of each pencil board are rigidly connected to each other by the connecting layers 4 and the binding agent, the adhesive and/or the other additives penetrate only from the connecting layers 4 into the respectively adjacent material layers 2.

FIGS. 7 and 8 show a writing utensil according to the present invention of laminated material, wherein the shaft 11 is composed of layers 2 or webs or foils of natural fibers 3 or powders of wood fibers or wood chips, wherein the layers are placed on top of each other and connected to each other. A lead 6 is glued or placed between the layers. The composition of the shaft 11 is as described in connection with FIG. 6 and, thus, the migration layers 5 have different concentrations of binding agent, adhesive and/or other additives and different densities and the migration layers 5 can completely penetrate through the layers 2 from both sides. Also in this case, the individual layers 2 are fixedly connected to each other by the connecting layers 4 and the binding agent, the adhesive and/or the other additives have penetrated from the connecting layers 4 into the respectively adjacent material layers 2.

The invention is not limited by the embodiments described above which are presented as examples only but can be modified in various ways within the scope of protection defined by the appended patent claims.

I claim:

1. A method of manufacturing pencil boards or shafts for utensils for writing, drawing or painting, the method comprising initially producing in a container a pulp essentially composed of raw material powder and water or fibers and water, wherein the pulp is essentially free of binding agent, applying the pulp onto a screen and predrying the pulp in layers in the form of webs or foils so as to form a non-woven fabric, rolling the fabric onto a roller, applying between the material layers a connecting layer of binding agent, adhesive and/or other additives, dehydrating and drying the resulting laminated plates, the number of fabric layers forming the plates corresponding to a desired plate thickness, subsequently cutting all layers along a cutting line on the roller, carrying out afterdrying and a thermal aftertreatment for solidifying the binding agent, the adhesive and/or the other additives, and further processing the plates into pencil boards or shafts for utensils for writing, drawing or painting.

2. The method according to claim 1, comprising placing the individual material layers as pulp composed of fibers and water onto the screen and simultaneously orienting the fibers in a longitudinal direction in an orientation portion above a first dehydrating zone and subsequently fixing the fibers during further drying in a fixing area in a vacuum zone.

3. The method according to claim 1, comprising making grooves in the pencil boards.

* * * * *